US012741360B2

(12) United States Patent
Garber

(10) Patent No.: US 12,741,360 B2
(45) Date of Patent: Sep. 22, 2026

(54) FASTENER DEVICE WITH A SENSOR FOR WORKPIECE DETECTION

(71) Applicant: BLACK & DECKER, INC., New Britain, CT (US)

(72) Inventor: Stuart Garber, Towson, MD (US)

(73) Assignee: BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 18/830,646

(22) Filed: Sep. 11, 2024

(65) Prior Publication Data

US 2025/0083290 A1 Mar. 13, 2025

Related U.S. Application Data

(60) Provisional application No. 63/582,310, filed on Sep. 13, 2023.

(51) Int. Cl.

*B65B 1/06* (2006.01)
*B25C 1/00* (2006.01)
*B25C 1/06* (2006.01)

(52) U.S. Cl.

CPC ................ *B25C 1/008* (2013.01); *B25C 1/06* (2013.01); *B25C 1/001* (2013.01)

(58) Field of Classification Search

CPC ............ B25C 1/001; B25C 1/06; B25C 1/008

(Continued)

(56) References Cited

U.S. PATENT DOCUMENTS 6,536,536 B1 3/2003 Gass et al.
6,834,730 B2 12/2004 Gass et al.

(Continued)

FOREIGN PATENT DOCUMENTS

DE 2007361 A1 9/1971
DE 44 05 648 A1 8/1995

(Continued)

OTHER PUBLICATIONS

VL53L1X Time-of-Flight (ToF), https://www.st.com/resource/en/data_brief/p-nucleo-53l1a1.pdf (Feb. 2018).

(Continued)

*Primary Examiner* — Praachi M Pathak

(74) *Attorney, Agent, or Firm* — Pillsbury Winthrop Shaw Pittman, LLP

(57) ABSTRACT

A fastener device that drives a fastener from a plurality of fasteners into a workpiece is provided. The fastener device comprises a housing, a nose assembly, a magazine, a driver, a motor assembly, a trigger switch, a sensor, and a controller. The motor assembly is configured to transmit power to a driver to thereby cause the driver to translate along the drive axis. The trigger switch is configured to be actuated in response to an operator input to generate a trigger switch signal. The sensor is configured to sense a distance between the nosepiece and the workpiece and generate a sensor signal in response thereto. The controller is operatively connected to the motor assembly, the sensor and the trigger switch. The controller is configured to initiate a drive cycle of the fastening device to drive the fastener into the workpiece based on the trigger switch signal and the sensor signal.

23 Claims, 10 Drawing Sheets

(58) Field of Classification Search
USPC .............................................................. 227/2
See application file for complete search history.

(56) References Cited

U.S. PATENT DOCUMENTS

| | | | |
|---|---|---|---|
| 7,093,668 | B2 | 8/2006 | Gass et al. |
| 7,121,358 | B2 | 10/2006 | Gass et al. |
| 7,328,752 | B2 | 2/2008 | Gass et al. |
| 7,540,334 | B2 | 6/2009 | Gass et al. |
| 7,866,521 | B2 | 1/2011 | Gross et al. |
| 9,744,657 | B2 | 8/2017 | Baron et al. |
| 9,827,658 | B2 | 11/2017 | Gregory et al. |
| 10,693,344 | B2 | 6/2020 | Purohit et al. |
| 10,926,385 | B2 | 2/2021 | Myers et al. |
| 12,053,869 | B2 | 8/2024 | Moloznik |
| 2012/0006877 | A1 | 1/2012 | Lee et al. |
| 2022/0161404 | A1 | 5/2022 | Lim et al. |
| 2025/0312898 | A1 * | 10/2025 | Ypma .................. B25B 23/0064 |

FOREIGN PATENT DOCUMENTS

| | | | |
|---|---|---|---|
| EP | 3 398 720 | A1 | 11/2018 |
| WO | 99/42253 | A1 | 8/1999 |

OTHER PUBLICATIONS

File History of U.S. Appl. No. 18/465,295, filed Sep. 12, 2023 (not yet published).
Baluns, https://www.st.com/en/wireless-connectivity/baluns.html, retrieved from the internet on Sep. 5, 2024).
European Patent Office, Extended European Search Report issued in EP Patent Application No. 24199580.2, Mar. 24, 2025.

* cited by examiner

FASTENER DEVICE WITH A SENSOR FOR WORKPIECE DETECTION

CROSS-REFERENCE TO RELATED APPLICATION

This application claims priority to U.S. Provisional Application No. 63/582,310, filed Sep. 13, 2023, the contents of which are incorporated herein in its entirety by reference.

FIELD

The patent application relates, in general, to the field of power tools. In particular, this patent application relates to portable fastening or driving tools, such as a nailers and staplers.

BACKGROUND

Fastener devices/tools, such as nailers and staplers, are relatively commonplace in the construction trades. Several types of nailers have been introduced to the market in an effort to satisfy the demands of modern consumers. Some of the nailers use a spring-loaded device to push fasteners into position such that a drive mechanism or driver may then be actuated to fire or push a fastener into a workpiece.

Fastener device/tools may typically include a drum for storing a coil of collated fasteners and a feed mechanism or a feeder configured to feed the fasteners into a nose/nosepiece/nose assembly of the fastener tool/device. These fastener devices/tools are known in the art for attaching a series or a succession of nails or fasteners into workpieces.

The fastener devices can be battery powered or pneumatic powered. The pneumatic powered fastener tools/devices can employ pneumatic actuation to drive a fastener into a workpiece. In these fastener devices, air pressure from a pneumatic system can be utilized to both drive the fastener into the workpiece and to reset the device after driving the fastener. It will be appreciated that, in the pneumatic fastener system, a hose and a compressor are required to accompany the fastener device. The battery powered fastener device can engage a transmission and a motor to drive a fastener. A solenoid has been used in fastener devices to drive small fasteners. Typically, the solenoid executes multiple impacts on a single fastener to generate the force needed to drive the fastener into a workpiece. In other instances, corded fastener tools/devices, i.e., connected to wall voltage, can use a solenoid to drive the fastener in a single stroke.

Contact trips are switches present on most fastener devices/nailers and are controlled by the standards in electrical products. There are exceptions for the fastener devices where the contact trip impairs the proper use of the fastener device (e.g., pin nailers, heavy duty staplers (e.g., T50), metal connector nailers (e.g., MCN), and assembly line uses). Some users may attempt to defeat the contact trip on all fastener devices by tying them on in attempts to go faster (e.g., roofing and framing applications), and not damage their work by pushing on it (i.e., trim).

The present patent application provides improvements in the fastener devices.

SUMMARY

One aspect of the present patent application provides a fastener device that drives a fastener from a plurality of fasteners into a workpiece. The fastener device comprises a housing, a nose assembly, a magazine, a driver, a motor assembly, a trigger switch, a sensor, and a controller. The nose assembly is connected with the housing. The nose assembly has a nosepiece and a drive channel into which the fastener to be driven into the workpiece is fed. The magazine is configured to hold the plurality of supply of the fasteners and from which the fastener is fed into the drive channel. The driver is movable along a drive axis of the nose assembly to engage and drive the fastener in the drive channel into the workpiece. The motor assembly is disposed within the housing. The motor assembly is configured to transmit power to the driver to thereby cause the driver to translate along the drive axis. The trigger switch is carried by the housing. The trigger switch is configured to be actuated in response to an operator input to generate a trigger switch signal. The sensor is configured to sense a distance between the nosepiece and the workpiece and generate a sensor signal in response thereto. The controller has one or more processors and is operatively connected to the motor assembly, the sensor and the trigger switch. The controller is configured to initiate a drive cycle of the fastening device to drive the fastener into the workpiece based on the trigger switch signal and the sensor signal.

The sensor may be a non-contact sensor. The sensor may be a time-of-flight sensor. The sensor may be a light sensor. The sensor may be a distance sensor.

The sensor may be disposed on at least one of a portion of the magazine or a portion of the housing. The sensor may include a plurality of sensors. One of the plurality of sensors is disposed on the portion of the magazine, and the other of the plurality of sensors is disposed on the portion of the housing.

The controller may be configured to initiate the drive cycle of the fastening device to drive the fastener into the workpiece when the sensor signal meets a predetermined threshold. The predetermined threshold may include a range of the distance between the nosepiece and the workpiece that is between 0 and 2 millimeters (mm).

The sensor may include a transmitter configured to transmit a signal to the workpiece and a receiver configured to receive a reflected signal from the workpiece.

The nosepiece may be disposed at a forward end of the nose assembly.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

Other aspects, features, and advantages of the present patent application will become apparent from the following detailed description, the accompanying drawings, and the appended claims.

DETAILED DESCRIPTION

Figure 1:
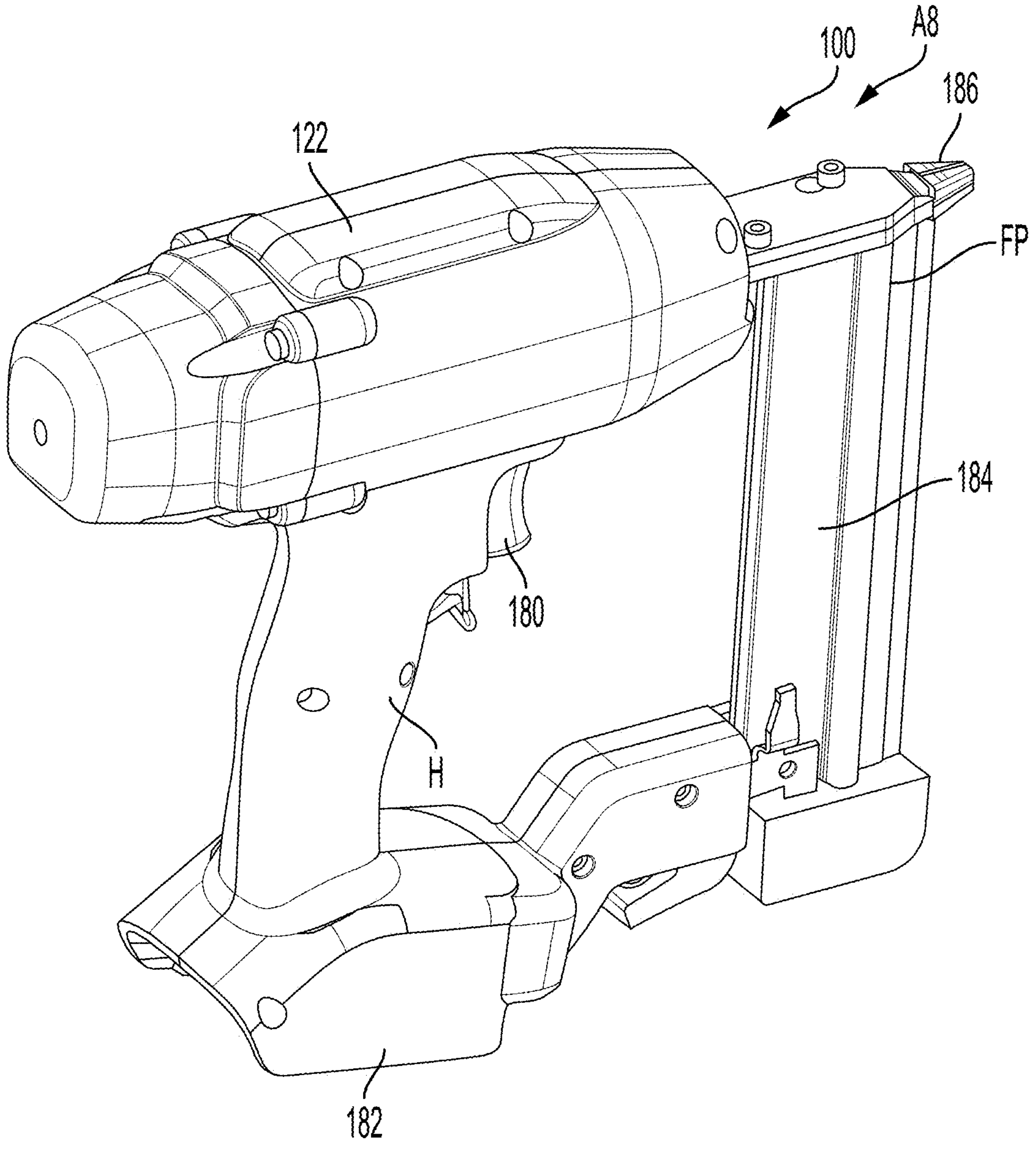
FIG. 1 shows an exemplary fastener device according to an embodiment of the present patent application.
Figure 2:
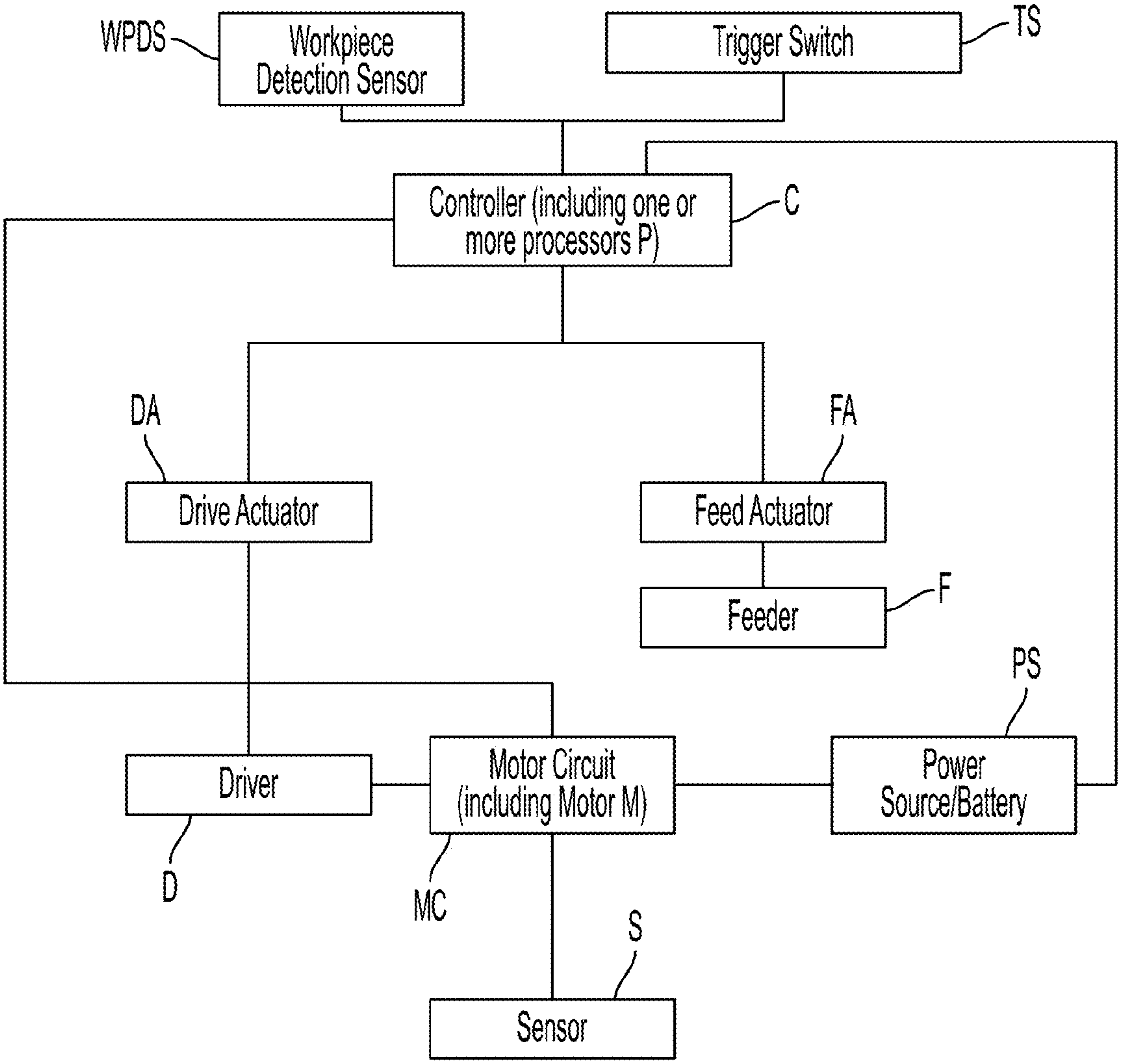
FIG. 2 is a schematic representation showing electrical and mechanical connections between a controller, a drive actuator, a feed actuator, a driver, a feeder, a motor circuit including a motor, a workpiece detection sensor, and other sensors, as well as some of switches included in the fastener device according to an embodiment of the present patent application.

In one embodiment of the present patent application, referring to FIGS. 1-2, a fastener device 100 that drives a fastener (not shown) into a workpiece (not shown) is provided. The fastener device 100 drives the fastener from a plurality of fasteners into the workpiece. The fastener device 100 comprises a housing 122, a nose assembly 18, a magazine 184, a driver D, a motor assembly MC, a trigger switch TS, a sensor WPDS, and a controller C. The motor assembly may interchangeably referred to as motor circuit. The motor assembly include a motor M. The nose assembly 18 is connected with the housing 122. The nose assembly 18 includes a nosepiece 186 and a drive channel into which the fastener to be driven into the workpiece is fed. The magazine 184 is configured to hold the plurality of supply of the fasteners and from which the fastener is fed into the drive channel. The driver D may be disposed in the nose assembly 18. The driver D is movable along a drive axis or an axis of the nose assembly 18 to engage and drive the fastener in the drive channel into the workpiece. The motor assembly MC is disposed within the housing 122. The motor assembly MC is configured to transmit power to the driver to thereby cause the driver to translate along the drive axis. The trigger switch TS is carried by the housing 122. In one embodiment, the trigger switch TS is disposed on the housing 122. The trigger switch TS is configured to be actuated in response to an operator input to generate a trigger switch signal. The sensor WPDS is configured to sense a distance between the nosepiece 186 and the workpiece and generate a sensor signal in response thereto. The controller C has one or more processors P and is operatively connected to the motor assembly MC, the sensor WPDS and the trigger switch TS. The controller C is configured to initiate a drive cycle of the fastening device 100 to drive the fastener into the workpiece based on the trigger switch signal and the sensor signal.

The sensor WPDS may be a non-contact sensor. The sensor WPDS may be a time-of-flight sensor. The sensor WPDS may be a light sensor. The sensor WPDS may be a distance sensor.

Figure 3:
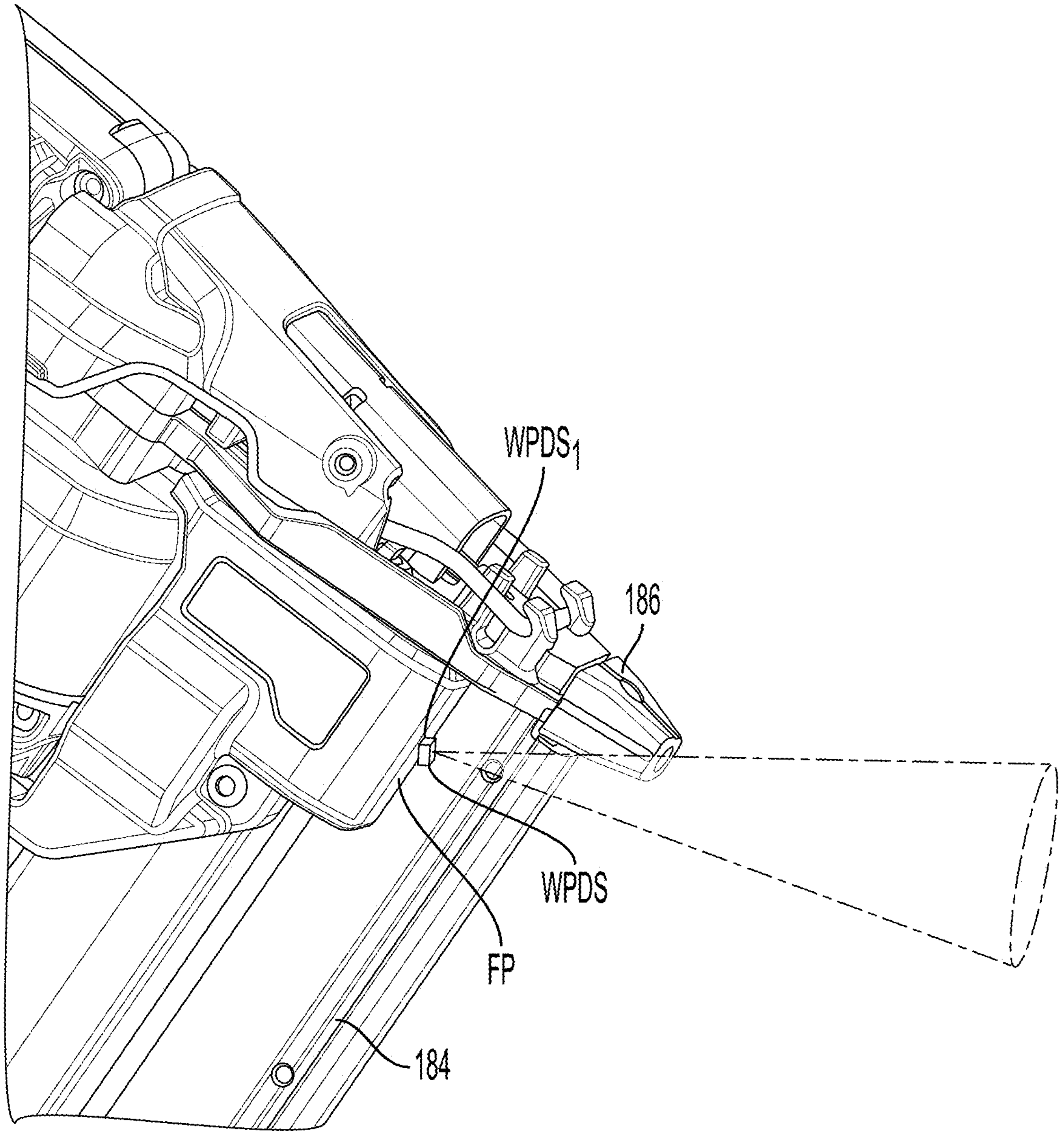
FIG. 3 shows a side perspective view of an exemplary workpiece detection sensor arrangement of a fastener device according to an embodiment of the present patent application.
Figure 4:
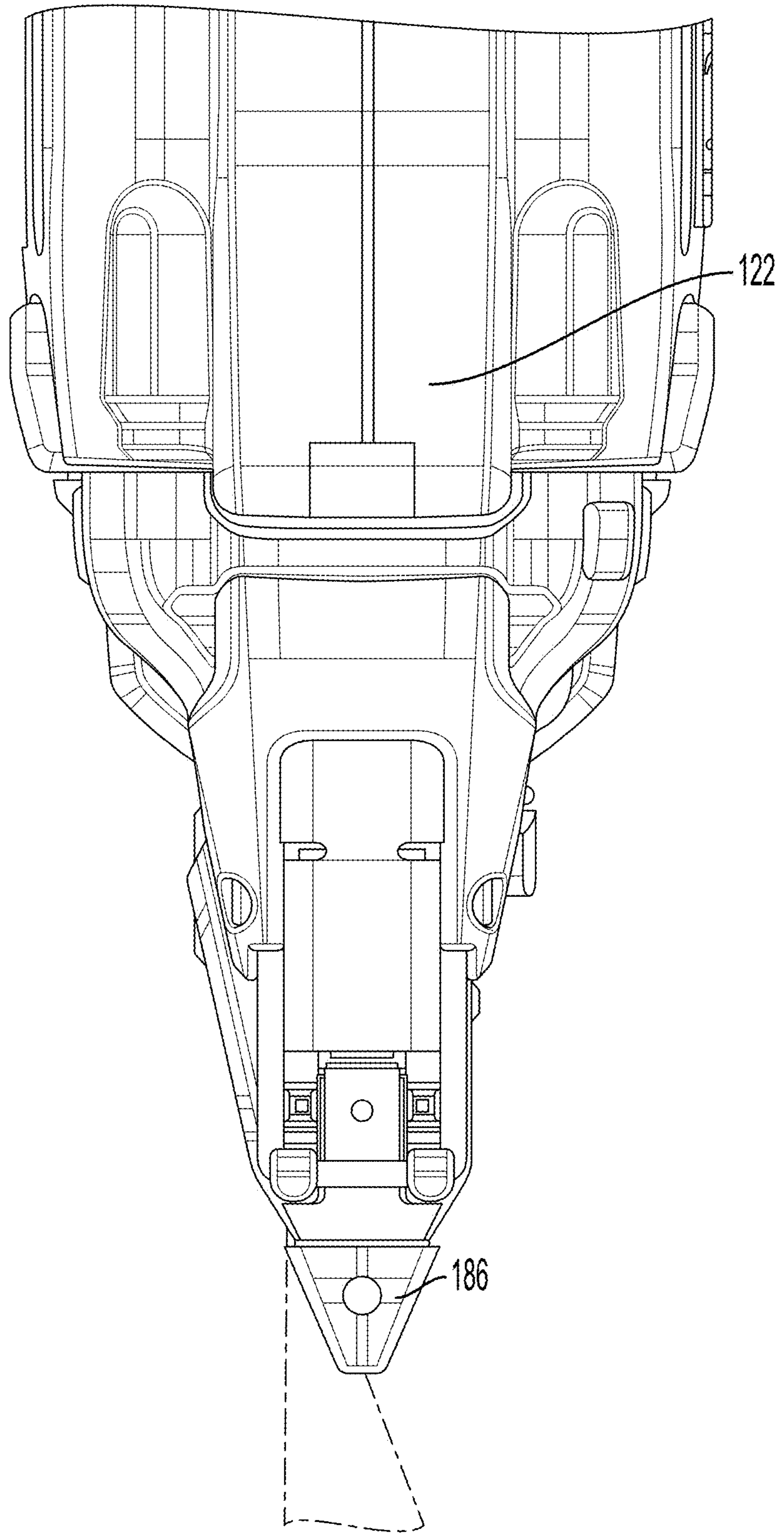
FIG. 4 shows a top perspective view of the single workpiece detection sensor arrangement of FIG. 3.
Figure 5:
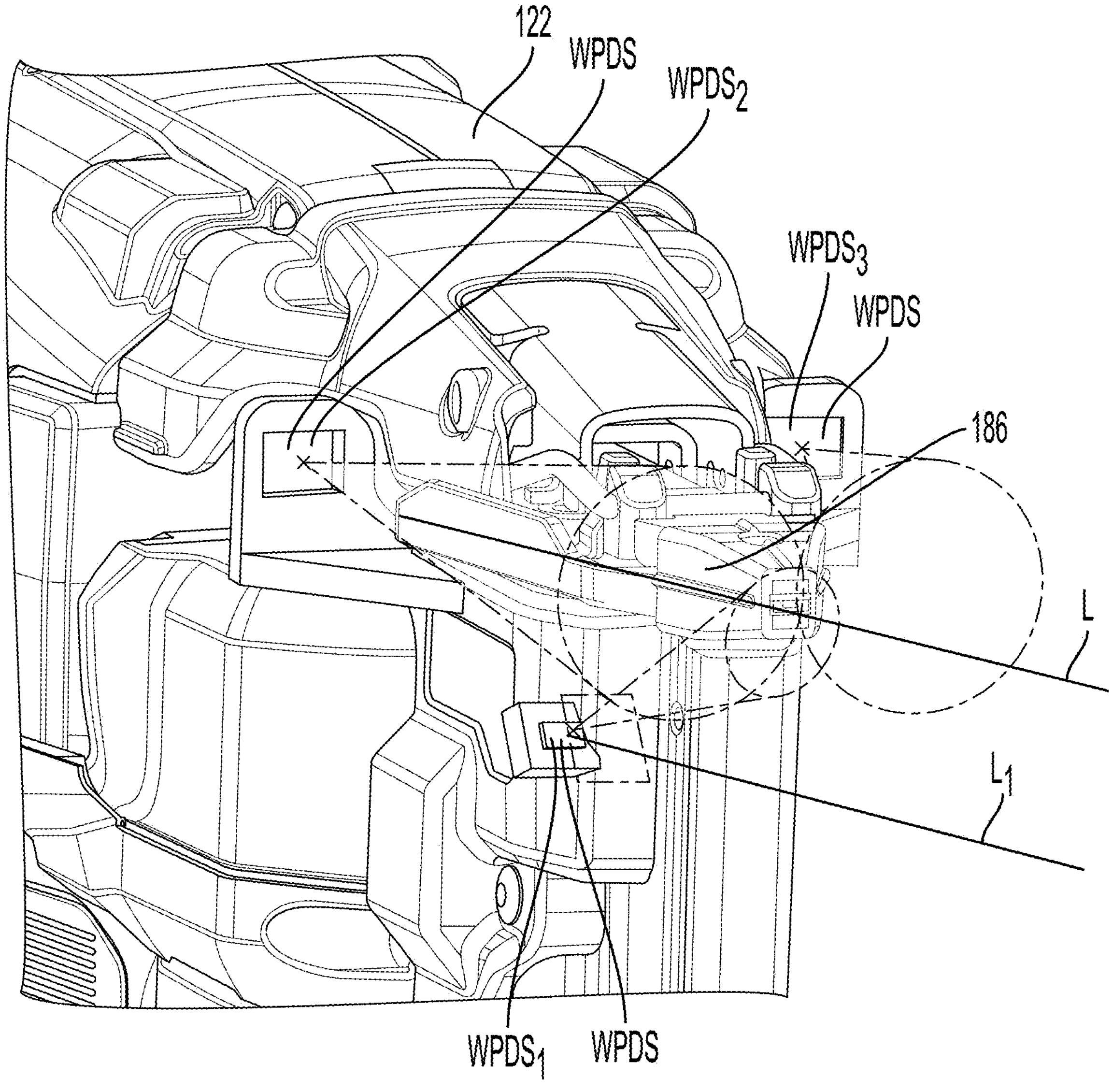
FIG. 5 shows a perspective view of the single workpiece detection sensor arrangement of FIG. 3.
Figure 6:
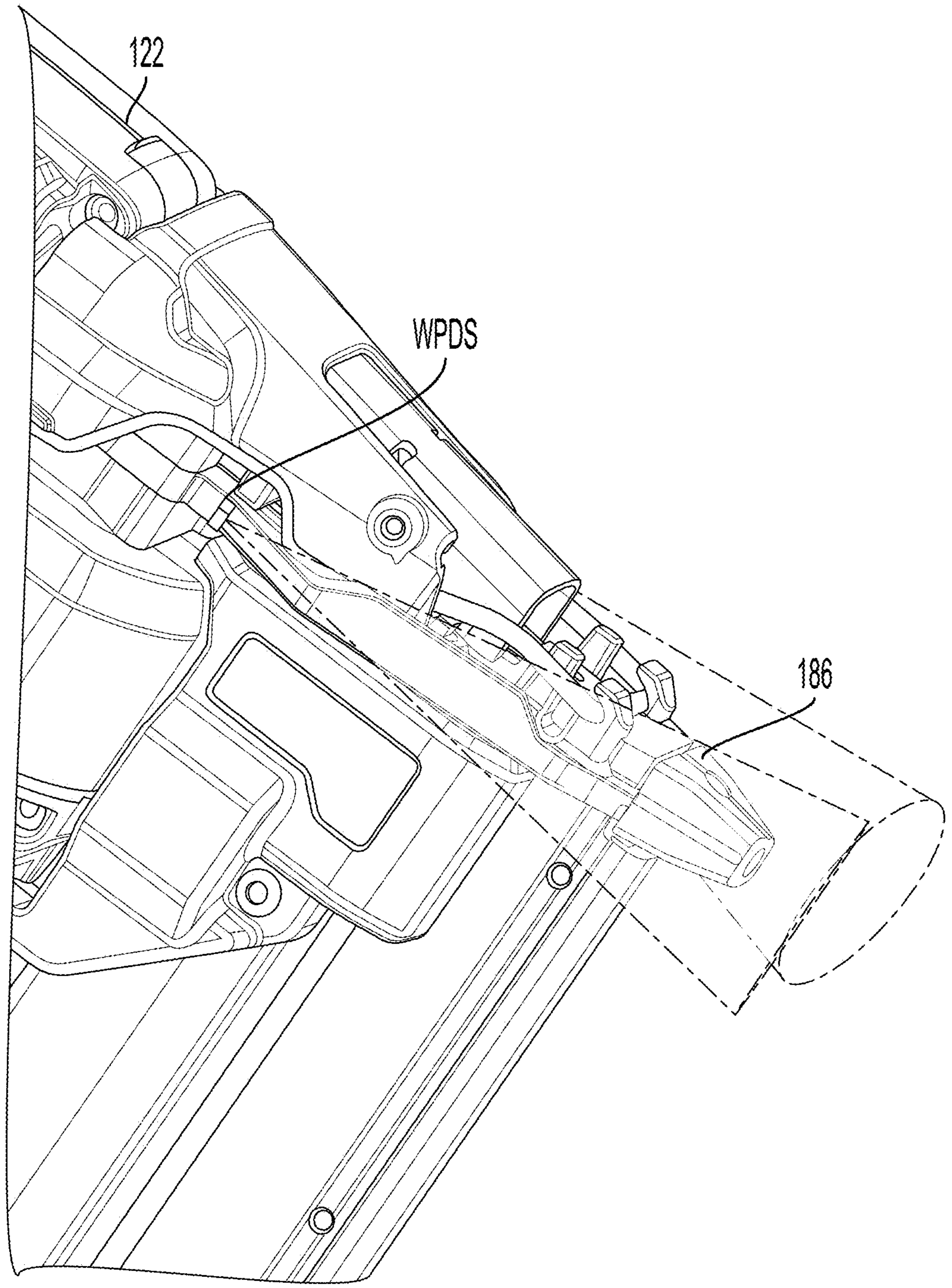
FIG. 6 shows a side perspective view of another exemplary workpiece detection sensor arrangement of a fastener device according to an embodiment of the present patent application.
Figure 7:
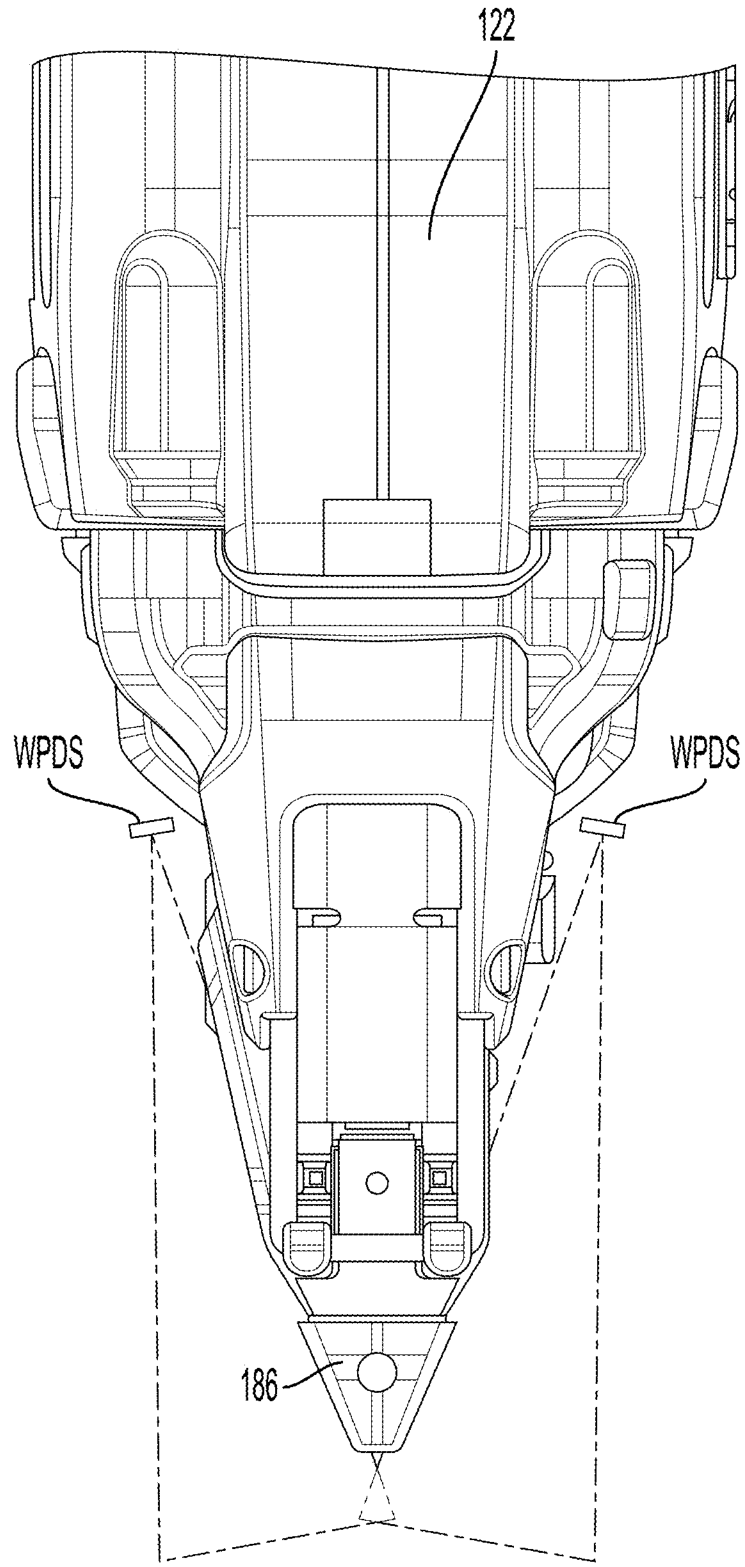
FIG. 7 shows a top perspective view of the workpiece detection sensor arrangement of FIG. 6.
Figure 8:
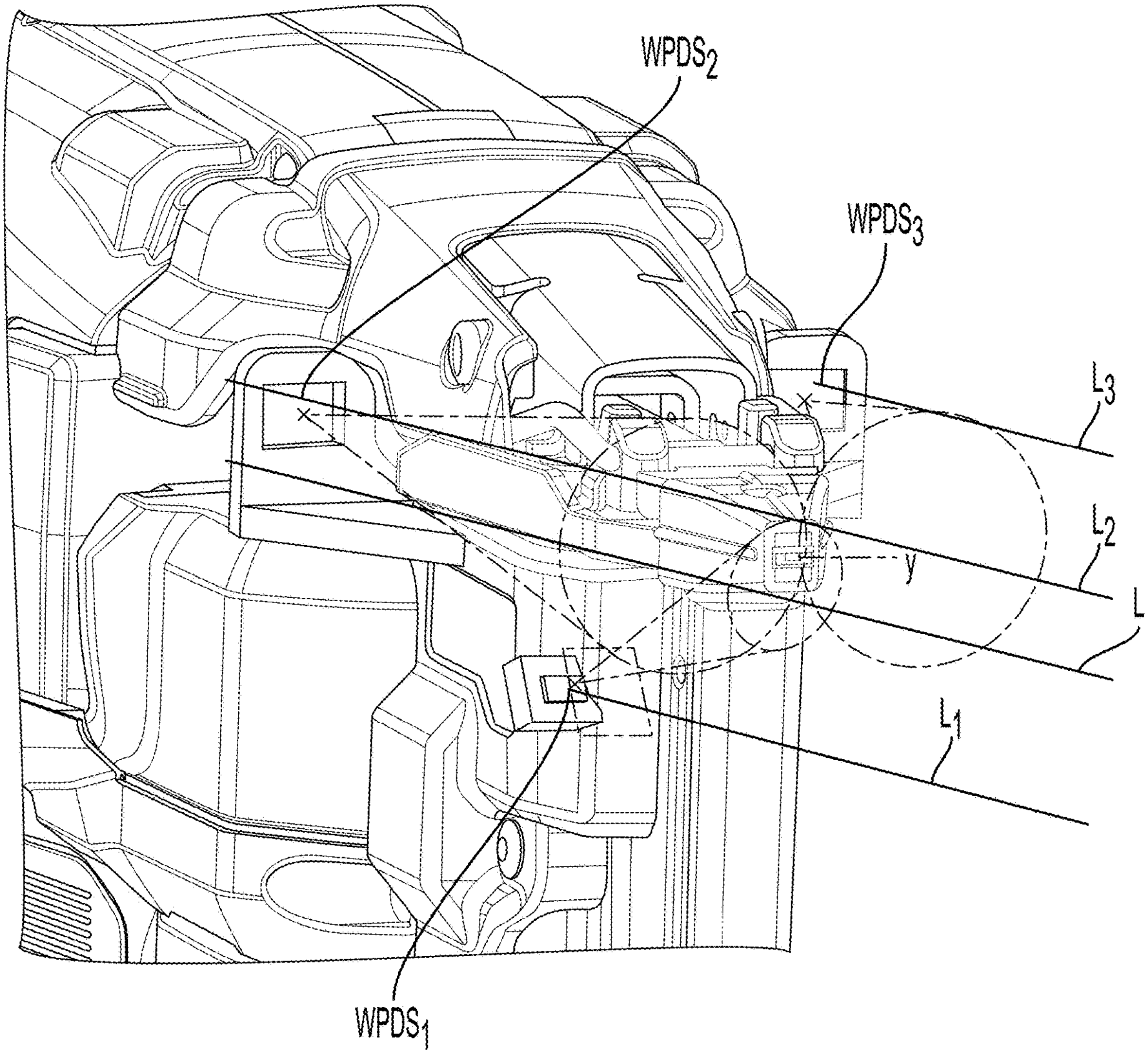
FIG. 8 shows a perspective view of the workpiece detection sensor arrangement of FIG. 6.

The sensor WPDS may be disposed on at least one of a portion of the magazine 184 (as shown in FIGS. 3-5) or a portion of the housing (as shown in FIGS. 6-8). Also, referring to FIGS. 6-8, the sensor WPDS may include a plurality of sensors. One of the plurality of sensors is disposed on the portion of the magazine 184, and the other of the plurality of sensors is disposed on the portion of the housing 122.

The controller C may be configured to initiate the drive cycle of the fastening device 100 to drive the fastener into the workpiece when the sensor signal meets a predetermined threshold. The predetermined threshold may include a range of the distance between the nosepiece and the workpiece that is between 0 and 2 millimeters (mm).

The sensor WPDS may include a transmitter configured to transmit a signal to the workpiece and a receiver configured to receive a reflected signal from the workpiece.

The nosepiece 186 may be disposed at a forward end of the nose assembly 18.

The nose assembly 18 is connected with the housing 122. The fastener device 100 may also include a feeder F. The feeder F is configured to feed the fastener into the drive channel of the nose assembly 18 prior to the driver D driving the fastener into the workpiece. The fastener device 100 may also include a power source, other sensor(s), a feed actuator FA, a drive actuator DA, these will be described in detail in the discussions below.

This patent application relates, in general, to the field of power tools. For example, this patent application relates to corded or cordless, portable fastener driving tools, such as a nailers and staplers, and improvements made therein. In particular, the fastener tool 100 includes a workpiece detection sensor WPDS. The workpiece detection sensor WPDS may be a non-contact workpiece detection sensor. That is, the workpiece detection sensor WPDS is configured to detect the presence of a workpiece (into which the fastener is driven by the fastener device 100). A single time-of-flight sensor (as shown in FIGS. 3-5) or a pair of time-of-flight sensors (as shown in FIGS. 6-8) may be mounted about the forward end or nosepiece of the fastening device/tool 100 and aimed at an area about the nosepiece tip. The time-of-flight sensors may be distance sensors that use the time that it takes for photons to travel between two points, in this case, the nosepiece and the workpiece to calculate the distance between the nosepiece and the workpiece. When the distance between the nosepiece and the workpiece is between 0 and 2 mm, the fastening device/tool 100 is configured to actuate.

The Time-of-Flight principle (ToF) is generally a method for measuring the distance between the sensor and the workpiece, based on the time difference between the emission of a signal and its return to the sensor, after being reflected by the workpiece. Various types of signals (also called carriers) can be used with the Time-of-Flight principle, the most common being sound and light. The time-of-flight sensor may be an optical sensor. The optical sensor may be configured to detect whether the workpiece is present (e.g., in front of the nosepiece) or not present.

The time-of-flight sensor may also be referred to as ToF sensor or time-of-flight camera (ToF camera). The time-of-flight sensor may be a range imaging camera/sensor system that is configured to measure distances between the camera/sensor and the workpiece for each point of the image based on time-of-flight, the round trip time of an artificial light signal, as provided by a laser or an LED.

Several different technologies for the time-of-flight cameras/sensors may be used and they include RF-modulated light sources with phase detectors, Range gated imagers, Direct Time-of-Flight imagers, etc. RF-modulated light sources with phase detectors are configured to work by modulating the outgoing beam with an RF carrier, and then measuring the phase shift of that carrier on the receiver side. Range gated imagers may have a built-in shutter in the image sensor that opens and closes at the same rate as the light pulses are sent out. Direct Time-of-Flight imagers measure the direct time-of-flight required for a single laser pulse to leave the camera and reflect back onto the focal plane array.

The time-of-flight camera/sensor may include an illumination unit that illuminates the area (e.g., around the nosepiece of the fastener tool 100), an image sensor, and an optical lens that is configured to gather the reflected light and images the area/environment onto the image sensor (e.g., focal plane array).

The illumination unit may also interchangeably referred to a light source. The illumination unit may include a laser or an LED.

The image sensor may also interchangeably referred to an imager. Each pixel of the image sensor is configured to measure the time the light has taken to travel from the illumination unit to the workpiece and back to the image sensor.

The optical lens may also interchangeably referred to an imaging lens. The time-of-flight camera/sensor may also include driver electronics. That is, both the illumination unit and the image sensor have to be controlled by high speed signals and synchronized. These signals may have to be very accurate to obtain a high resolution. The distance is calculated directly in the camera/sensor. To obtain good performance, some calibration data may also be used. The camera/sensor may then be configured to provide a distance image over some interface, for example USB or Ethernet.

In one embodiment, the size of the time-of-flight sensor may be 3 by 5 millimeters (mm).

Referring to FIGS. 3-5, in one embodiment, a single time-of-flight sensor arrangement $WPDS_1$ may be used as the workpiece detection sensor WPDS of the fastener device 100. The single time-of-flight sensor may have smaller trigger area and lower cost. For example, the trigger area of the time-of-flight sensor, shown in FIGS. 3-5, may be 109.7 millimeter squared ($mm^2$). The sensor, in FIGS. 3-5, may be disposed in a portion FP of the magazine 184 that is in an area near/in the vicinity of the nosepiece 186. The sensor, in FIGS. 3-5, may be configured to measure the time for a focused laser to be emitted and received so as to determine the range/distance of the workpiece from the workpiece. This type of sensor may be found in most cell phones.

Referring to FIGS. 6-8, in another embodiment, a dual time-of-flight sensor arrangement $WPDS_2$ and $WPDS_3$ may be used as the workpiece detection sensor WPDS of the fastener device 100. The dual time-of-flight sensor may have larger trigger area. Each trigger area of the time-of-flight sensor, shown in FIGS. 6-8, is 473.61 millimeter squared ($mm^2$). The sensors, in FIGS. 6-8, are disposed on either side of the nosepiece 186. The sensors, in FIGS. 6-8, are disposed on the nose assembly 18 and/or the housing 122 in an area after a rear end of the nose piece 186. The sensors, in FIGS. 6-8, are configured to measure the time for the focused lasers to be emitted and received so as to determine the range/distance of the workpiece from the workpiece. These type of sensors may be found in most cell phones.

In one embodiment, the time-of-flight sensor $WPDS_1$ may be used together as the workpiece detection sensor arrangement WPDS of the fastener device 100. In another embodiment, the time-of-flight sensors $WPDS_2$ and $WPDS_3$ may be used together as the workpiece detection sensor arrangement WPDS of the fastener device 100. In yet another embodiment, the time-of-flight sensors $WPDS_1$, $WPDS_2$ and $WPDS_3$ may be used together as the workpiece detection sensor arrangement WPDS of the fastener device 100.

Referring to FIG. 8, longitudinal axis $L_2$ of the time-of-flight sensor $WPDS_2$ and longitudinal axis $L_3$ of the time-of-flight sensor $WPDS_3$ are positioned above longitudinal axis L (i.e., passes through a center or a middle portion of the nosepiece 186), and longitudinal axis $L_1$ of the time-of-flight sensor $WPDS_1$ is positioned below longitudinal axis L. The longitudinal axis $L_2$ of the time-of-flight sensor $WPDS_2$ and the longitudinal axis $L_3$ of the time-of-flight sensor $WPDS_3$ lie in planes that are positioned above the plane of the longitudinal axis L. The longitudinal axis $L_2$ of the time-of-flight sensor $WPDS_2$ and the longitudinal axis $L_3$ of the time-of-flight sensor $WPDS_3$ lie in the same plane that is positioned above the plane of the longitudinal axis L. The longitudinal axis $L_1$ of the time-of-flight sensor $WPDS_1$ lies that is positioned below the plane of the longitudinal axis L.

In one embodiment, as shown in FIG. 2, when the distance between the nosepiece 186 and the workpiece is determined to be between 0 and 2 mm and the trigger switch TS is close, the controller C is configured to actuate the drive system to fire a fastener. Such features are known in the art and thus not further described here. That is, the trigger switch TS is configured to generate a trigger signal that may be employed in whole or in part to initiate the cycling of the fastener device 100 to install a fastener to a workpiece.

In one embodiment, the time-of-flight sensor may include VL53L1X Time-of-Flight (ToF), as descried in detail in https://www.st.com/resource/en/data_brief/p-nucleo-53l1a1.pdf, which is incorporated by reference in its entirety. This technology allows absolute long-distance distance to be measured independently of target reflectance. Instead of estimating the distance by measuring the amount of light reflected back from an object (which may be significantly influenced by color and surface), this sensor may precisely measure the time the light takes to travel to the nearest object and reflect back to the sensor (Time-of-Flight).

The fastener device 100 may be interchangeably referred to as a fastener driver, a fastener driving tool, a fastener tool, a fastener driving device, a nailer, a stapler, a device, or a tool that is adapted to drive fastener(s) into the workpiece. The fasteners may be staples, U-shaped staples, brads, nails, clips, fasteners, or any such suitable fastener. The fastener and the nail may be used interchangeably. In one embodiment, the fasteners may be collated. The fastener device 100 may be a cordless power tool, in accordance with an embodiment. In one embodiment, the fastener device 100 is a nailer or a nail gun configured to drive nail(s) into the workpiece. In one embodiment, the fastener device 100 is a stapler or a stapler gun configured to drive staple(s) into the workpiece. In one embodiment, the fastener device 100 includes a battery powered device or a cordless device. In one embodiment, the fastener device 100 includes a battery powered nailer/nail gun. In another embodiment, the fastener device 100 includes a battery powered stapler gun. In yet another embodiment, the fastener device 100 is configured to drive one or more fasteners, including nails, staples, brads, clips or any such suitable fastener, into the workpiece.

In one embodiment, the tool housing 122 may be an exterior (claim shell) housing. A battery 182 of the fastener device 100 can be configured with a suitable nominal voltage such as 7.2, 12, 36 volts, etc. using a suitable battery chemistry such as nickel cadmium, lithium ion, etc. In one embodiment, the fastener driver 100 can also be configured to be hybrid between being powered by an alternating current (AC) power source (e.g., wall voltage) and a direct current (DC) power source (e.g., the battery).

In one embodiment, the fastener device 100 may include a flywheel nailer mechanism with a flywheel (not shown) that is configured to drive the driver D. The flywheel nailer mechanism is described in U.S. Pat. Ser. No. 18/465,295, which is commonly assigned and is incorporated herein by reference in their entirety. The flywheel nailer mechanism may have a wide variation in time from start to finish depending upon the application (e.g., nail length, nail type, density of the workpiece, orientation of the workpiece, etc.).

In another embodiment, the fastener device 100 may include a linear electromagnetic motor or a multistage linear electromagnetic motor that is configured to drive the driver D. The linear electromagnetic motor mechanism is described in detail in U.S. Pat. Ser. No. 17/224,798, which is commonly assigned and is incorporated herein by reference in its entirety.

The housing 122 may be formed from molded parts. In one embodiment, a first side part and a second side part of the housing 122 may be molded and joined together to encapsulate parts of the fastener driving mechanism and fastener feed mechanism (described in greater detail later) within the housing 122. The driving mechanism may be interchangeably referred to as the driver D and the feed mechanism may interchangeably referred to as the feeder F. The housing 122 may be made of extruded or molded plastic material, for example. The housing 122 may be formed from an Acrylonitrile Butadiene Styrene (ABS) plastic material. These examples materials of the housing 122 should not be limiting. Other materials, such as polycarbonates and/or combinations of materials, may also be used to form the housing 122. The housing 122 has a front end and a back end. The housing 122 may include a handle H adapted to be gripped by the hand of an operator or user. In one embodiment, the handle H extends between a top end and a bottom end of the housing 122. The housing 122 may also conventionally house a trigger 180 and the motor M with the driver D, which may be selectively translated along the axis to drive the fastener into the workpiece. Further details of the housing 122 are provided in commonly assigned U.S. Pat. No. 7,866,521 ("the '521 Patent") and U.S. Patent Application Publication No.: 2022/0161404 ("the '404 Patent Application"), each of which are commonly assigned and are incorporated by reference in their entirety.

The nose assembly 18 may extend from the housing 122 proximate the magazine (described in detail below) and may be conventionally configured to engage the magazine 184 so as to sequentially receive fasteners therefrom. The nose assembly 18 may also serve in a conventional manner to guide the driver D and fastener when the fastener driver 100 has been actuated to install the fastener to a workpiece. The nose assembly 18 may include a barrel that forms a part of the drive channel for the driver D to move within an interior portion thereof and drive a fastener. The nose assembly 18 may be interchangeably referred to as nosepiece. The nose assembly 18 of the fastener device 100 may include one, some, or all features as described in U.S. Pat. Nos. 9,827,658 and/or 10,926,385, both of which are commonly assigned and are incorporated by reference herein in their entireties.

The fastener device 100 may include a magazine assembly 184, which may be coupled to the housing 122. The magazine assembly 184 may be interchangeably referred to as magazine. The magazine assembly 184 may be coupled to the nose assembly 18 and disposed within the housing 122. The magazine assembly 184 is configured to carry a supply of fasteners through a feed channel along a feed channel direction toward the nose assembly 18. The feeder F is configured to feed the fastener through the magazine assembly 184 and into the drive channel prior to driving the fastener into the workpiece.

The magazine assembly 184 is an elongated receptacle that extends away from the nose assembly 18, towards a back end of the handle H. In one embodiment, the magazine assembly 184 may be provided such that it extends between the nosepiece 18 and a base portion of the fastener device 100 (e.g., near a removable battery pack 182 as shown in FIG. 1). In one embodiment, the magazine assembly 184 may be positioned an acute angle relative to the handle H and extending between the nose assembly 18 and a bottom portion of the handle H, such that a bottom portion of the magazine assembly 184 may be positioned at an acute angle relative to a workpiece when the nose assembly 18 is positioned and is configured for applying the fastener thereto.

The magazine assembly 184 is configured to hold a plurality of fasteners or nails and sequentially feed the fasteners into the nosepiece 18. These fasteners or nails are then configured to be dispensed from the fastener device 100 with sufficient energy to penetrate a workpiece. The magazine assembly 184 may be configured to hold collated nails. The magazine assembly 184 may include a canister that is configured to hold coiled, collated nails/fasteners. The canister arrangement is shown and described in detail in U.S. Pat. Ser. No. 18/465,295, which is commonly assigned and is incorporated herein by reference in their entirety. The magazine assembly 184 (via its parts therein) is generally configured to sequentially feed/present a lead fastener of the plurality of fasteners into a drive channel of the fastener driving tool 100. The magazine assembly 184 may include the feeder or feed mechanism F, which will be described in detail below. The magazine assembly 184 may be opened to load collated fasteners into the magazine assembly 184 as described in detail in the incorporated '521 Patent. The further details of the magazine assembly 184 are provided in the incorporated '521 Patent and the incorporated '404 Patent Application.

The trigger 180 may be adjacent to or on the handle H and may be connected to a controller C (also interchangeably referred to as a control unit or a power control module). The trigger 180 may be provided in the form of a button for manual operation such that when an operator/a user grips the handle H, the trigger 180 may be engaged by a forefinger of the operator/user. The trigger 180 is mechanically coupled to the handle H and is electrically coupled to at least the motor M and the controller C such that electric power may be selectively provided thereto. The trigger 180 may be a push button that moves back and forth, or a button that may be pivotally mounted to the housing 122 by way of a pivot, such that application of force via the operator's forefinger moves the trigger 180 relative to the handle H. The trigger 180 may be associated with a trigger switch/sensor TS. The trigger 180 may also be associated with a workpiece detection sensor WPDS and the controller C.

The workpiece detection sensor WPDS is configured to prevent accidental activation of the fastener device 100. Generally, an operator of the fastener device 100 may hold or grip the fastener device 100 by providing their hand around the handle H and place the nose assembly 18 at a desired location for applying a fastener, and depress the trigger 180 in order to activate the controller C and the internal actuators (as described in detail later) and to cause a fastener to be ejected at that desired location. In one embodiment, the workpiece detection sensor WPDS may be provided on the nose assembly 18. The workpiece detection sensor WPDS may be coupled to the nose piece 18. In operation, the signal from the workpiece detection sensor WPDS must be with the desired/predetermined distance range (i.e., distance between the workpiece and the nose-piece 186) in order to propel the driver D and drive the fastener into the workpiece.

Figure 9:
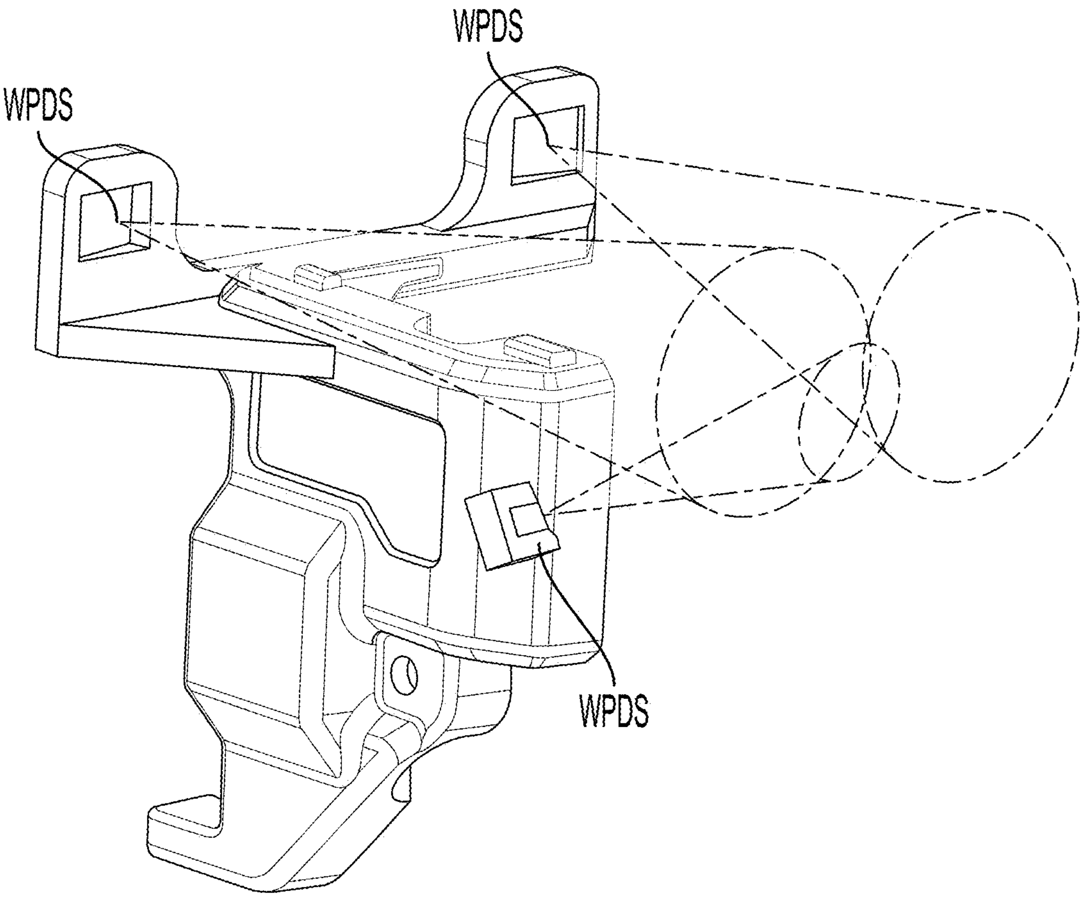
FIG. 9 shows another perspective view of the workpiece detection sensor arrangement of FIG. 6, where the fastener device is not shown to better illustrate the workpiece detection sensor arrangement.

FIG. 9 shows another perspective view of the workpiece detection sensor arrangement of FIG. 6, where the fastener device is not shown to better illustrate the workpiece detection sensor arrangement.

Other operation restricting devices (e.g., mechanical and/or electrical, like switches) may also be provided in the fastener device 100. The contact trip assembly may include a contact trip (or contact trip member) actuatable to initiate the drive stroke. The contact trip may be positioned in front of the driver D in the housing 122 of the fastener device 100. The contact trip is configured for movement relative to the housing 122 parallel to the movement of the driver D. Also, provided are a contact trip spring and a contact trip switch. The contact trip switch is configured such that the contact trip switch may be tripped or actuated (e.g., closed) to allow use of the fastener device 100 (when all conditions are met for driving or firing), and may also be electrically coupled to the controller C. The contact trip switch may be provided in a normally open position and closed when the contact trip spring is compressed by force upon the contact trip itself, for example. In one embodiment, as an operator applies force or bias on the fastener device 100, i.e., towards a workpiece, a contact surface of the contact trip assembly engages the workpiece and then actuates movement of the body of the contact trip relative to the drive channel, thereby closing the contact trip switch and spring-loading or compressing the contact trip spring that normally biases the contact trip assembly relatively forward such that the fastener device 100 is disabled from firing. The contact trip switch and the contact trip assembly may be optional.

When the trigger 180 is actuated by the operator's fore-finger (e.g., the trigger switch TS is closed) and all other conditions for firing are met, the drive system and thus the motor M may be initiated i.e., activated or energized, to fire a fastener. Such features are known in the art and thus not further described here. That is, the trigger switch TS is configured to generate a trigger signal that may be employed in whole or in part to initiate the cycling of the fastener device 100 to install a fastener to a workpiece.

The contact trip assembly is configured to slide rearwardly in response to contact with a workpiece and may interact with either the trigger 180 or a contact trip sensor/switch. When the contact trip assembly interacts with the trigger 180, the contact trip assembly cooperates with the trigger 180 to permit the trigger 180 to actuate the trigger switch TS to generate the trigger signal. More specifically, the trigger 180 may include a primary trigger, which is actuated by a finger of the user, and a secondary trigger, which is actuated by sufficient rearward movement of the contact trip assembly. Actuation of either one of the primary and secondary triggers will not, in and of itself, cause the trigger switch 180 to generate the trigger signal. Rather, both the primary and the secondary trigger must be placed in an actuated condition to cause the trigger 180 to generate the trigger signal. When the contact trip assembly interacts with the contact trip sensor/switch, rearward movement of the contact trip assembly by a sufficient amount causes the contact trip sensor/switch to generate a contact trip signal, which may be employed in conjunction with the trigger signal to initiate the cycling of the fastener device 100 to install a fastener to a workpiece.

In one embodiment, the controller C is configured to initiate a drive cycle of the fastening device 100 to drive the fastener into the workpiece based on the trigger switch signal and the sensor signal. In another embodiment, the controller C is configured to initiate a drive cycle of the fastening device 100 to drive the fastener into the workpiece based on the trigger switch signal, a signal from the contact trip assembly and the sensor signal.

Figure 10:
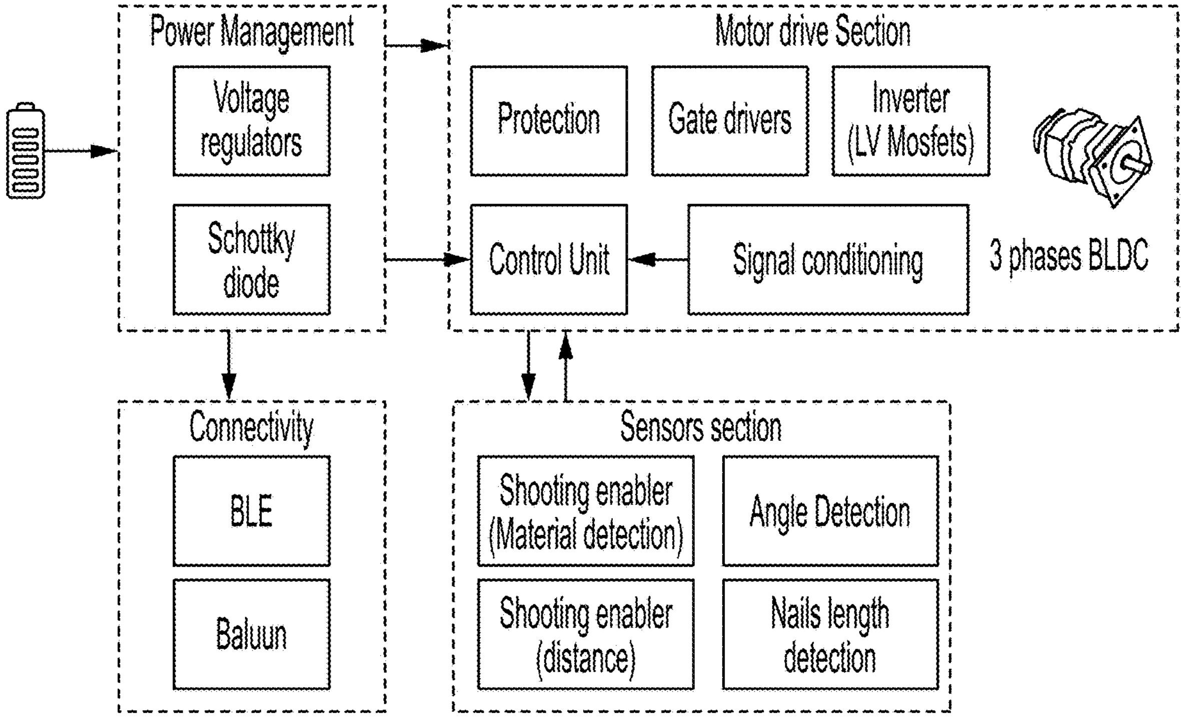
FIG. 10 is a schematic representation showing electrical and mechanical connections between a power management module, a connectivity module, a motor drive module, and a sensor module included in the fastener device with workpiece detection sensor arrangement according to an embodiment of the present patent application.

FIG. 10 is a schematic representation showing electrical and mechanical connections between a battery, a power management module, a connectivity module, a motor drive module, and a sensor module all included in the fastener device with workpiece detection sensor arrangement of the present patent application. The power management module may include voltage regulators and Schottky diode. The power management module may be operatively connected to the battery, the motor drive section/module and the connectivity module. The power management module may also operatively be connected to the control unit of the motor drive module/section.

The connectivity module may include Balun and Bluetooth Low Energy (BLE). The connectivity module may operatively be connected to the power management module. A balun is a type of transmission line transformer. This two-port component is placed between a source and load when a differential symmetric RF functional block needs to be connected to a single-ended block. These transformers are made by winding a strip-line on a high-permeability core substrate. Because of the high impedance of the winding, the balanced output terminals are isolated from the unbalanced input terminals. The most straightforward way to build a balun is with a two-winding transformer-based design, with one side grounded and the other side floating (differential). A balun can be used in either direction, so it can perform single-ended to balanced transformation, and the reverse. The key features of baluns include frequency range, bandwidth, insertion loss, magnitude imbalance, phase imbalance, linearity, distortion, and power rating. Size and cost are also important design considerations. Baluns use our monolithic RF IPD process to integrate high-quality RF passive components on a single glass substrate. RF IPD baluns are optimized for high RF integration and improve system performance. They simplify RFIC-to-antenna matching networks and their integrated harmonic filters aid compliance with major EMC regulations like CCC, FCC, ETSI, and ARIB. RF IPD baluns are used on many antennas and their feedlines to transform a balanced line to an unbalanced one. They usually integrate the matching impedance and optimize the RF power transmission to maximize performance. They usually occupy a very small footprint, less than 1 $mm^2$ for the complete function. For example, balun are described in detail in https://www.st.com/en/wireless-connectivity/baluns.html, which is incorporated by reference herein. BLE is a wireless, low-power personal area network that operates in the 2.4 GHz ISM band. Its goal is to connect devices over a relatively short range. BLE was created with IoT applications in mind, which has particular implications for its design. For example, IoT devices tend to be constrained and require extended battery use, so BLE favors low power consumption over continuous data transfer. In other words: when not in use, it goes into sleep mode to conserve energy.

The motor drive module may include a protection device, gate driver, inverter, control unit/controller, and signal conditioning unit/device. The motor may include a three phase brushless DC motor. The motor drive module/section may operatively be connected to the sensor module and the power management module. The control unit or controller of the motor drive module/section may operatively be connected to the power management module.

The sensor module may include shooting enabler for material detection, shooting enabler for distance measurement, angle detection unit, and nail length detection unit. The sensor module may operatively be connected to the motor drive module/section.

The driver D includes a driver blade at one end thereof. The driver D may be configured for translational movement within the drive channel/drive path along the drive axis. The driver D may also be configured to engage with and drive the lead fastener in the drive channel into a workpiece. The driver D may be made of any number of materials, including, but not limited to, aluminum, nickel, steel, stainless steel, and/or combinations thereof.

A drive system, associated with a drive actuator DA, is configured to selectively drive the driver D along the drive axis (or path), to drive the nail or fastener into a workpiece. The drive system (also interchangeably referred to herein as a drive motor assembly), may include the power source or power/energy assembly, the driver D, an activation arm assembly, and a return mechanism. The activation arm assembly and the return mechanism are described in detail in the incorporated '404 Patent Application.

In one embodiment, the energy/power source/assembly includes the motor M, the flywheel, and the drive actuator DA. In one embodiment, the motor M is an outer rotor brushless motor, wherein the rotor is provided on an outside and the stator is provided on an inside thereof. The flywheel may be coupled to an output shaft of the motor M. The motor M may be operable for rotating the flywheel, for example, via a motor pulley, a belt and a flywheel pulley. The outer rotor of the motor may be integrally formed with the flywheel. In another embodiment, the energy/power source/assembly includes a linear electromagnetic motor or a multistage linear electromagnetic motor that is configured to drive the driver D as described above.

In operation, fasteners are stored in the magazine assembly 184, which sequentially feeds the fasteners into the nose assembly 18. The drive motor assembly may be actuated/activated by the controller C to cause the driver D to translate and impact a fastener (i.e., in the drive channel) in the nose assembly 18 so that the lead fastener may be driven into a workpiece. Actuation of the power source may use energy (e.g., electrical energy from the battery pack 182) to operate the motor M and the drive actuator DA. The motor M is employed to drive the flywheel, while the drive actuator DA is configured to (e.g., move a roller that is associated with a roller assembly that configured to) squeeze the driver D into engagement with the flywheel so that energy may be transferred from the flywheel to the driver D to cause the driver D to translate. The nose assembly 18 (and the drive channel) guides the fastener as it is being driven into the workpiece. Actuation of the drive actuator DA causes the roller assembly to translate toward (e.g., in a generally downward direction) and engage the driver D to initiate driving engagement between the driver D and the flywheel and thus move the driver D into the drive channel of the nose assembly 18 that has a lead fastener therein. The drive actuator DA may be an electro-mechanical actuator such as a linear actuator. In one embodiment, the drive actuator DA is a solenoid. The details about the roller assembly the drive actuator may be found in the '404 Patent Application.

After the driver D has translated and fired the fastener from the nose assembly 18, the return mechanism may be employed to return the driver D to its starting position. The return mechanism biases the driver D into a returned/its starting position. For example, the return mechanism may include a biasing member, or spring, which is configured to push (e.g., backwards) the driver D back and away from the nose assembly 18 after the driver D is deployed to fire a fastener from the fastener device 100. When the driver D has been returned, the solenoid/drive actuator DA may be deactivated. In one embodiment, the drive actuator, the driver, and the drive system used in the fastener device 100 may be an electrical actuator, drive, and drive system and are further described in U.S. Pat. No. 9,744,657 ("the '657 Patent"), which is commonly assigned and is incorporated herein by reference in its entirety.

The fastener device 100 may be an electric fastener device or a pneumatic fastener device. The primary difference between the electric fastener device and the pneumatic fastener device is that the source of power or energy used to drive a fastener in the electric fastening tool is derived from the electric power, rather than pneumatic power. The electric power may be supplied, e.g., by a battery pack 182 or from being plugged into a common household AC outlet.

In one embodiment, the bottom end of the housing 122 may have a removable and rechargeable energy storage device, which may include the battery pack 182. The battery pack 182 may be configured to engage an end portion of the fastener device 100 and provide power to the motor M within the housing 122, such that the fastener device 100 may drive one or more fasteners that are fed from the magazine assembly 184 into a workpiece. The location of the battery pack 182 as shown in the Figures is not limiting and is illustrative only; indeed, the battery pack 182 can be located anywhere on the fastener device 100. In addition, although the energy storage device is illustrated as being a battery pack, embodiments of this disclosure are not limited to battery packs being the energy storage device. That is, in some embodiments, the fastener device 100 may include a cord and a plug for plugging into a common household AC outlet. While the fastener device 100 is described as being electrically powered by a suitable power source or energy storage device, such as the battery pack 22, those skilled in the art will appreciate that the disclosure, in its broader aspects, may apply to other powered fastening tools.

The energy assembly includes the motor M and the flywheel that is driven by the motor M. The flywheel is configured to transmit the power to the driver D to thereby cause the driver D to translate in the drive channel and along the drive axis.

The feeder, feed mechanism or feed assembly F, shown in FIG. 2, may include a feed pawl assembly (not shown) and a follower pawl assembly (not shown). The feed assembly F is associated with the magazine assembly 184 and is configured to advance the fasteners contained therein in a feed direction (i.e., towards the drive channel, the nose assembly 18 and the driver D) to present a lead fastener into the nose assembly 18. The feed assembly F has the feed actuator FA that is configured to move the lead fastener into the nose assembly 18. A coil or a set of the collated fasteners may be inserted into the canister and an end of the collated fasteners with a lead fastener may be strung towards the drive channel such that one of the collated fasteners is positioned in the feed assembly F for feeding (e.g., using teeth and/or a pawl assembly, and the feed actuator).

In one embodiment, the feed assembly F may include a biasing spring and a feed rod configured to move the lead fastener (from the set of collated fasteners contained in the canister) into the nosepiece assembly 18. The biasing spring may bias the feed rod into a first position, and the feed actuator may be configured to move (i.e., reciprocate) the feed rod to a second position, against a biasing force of the biasing spring, for moving the lead fastener into the nose assembly 18. In one embodiment, features of the feed assembly F may include those of the incorporated '521 reference. The feed actuator may be interchangeably referred to as the feed actuator FA. Like the drive actuator DA, the feed actuator FA may be an electro-mechanical actuator such as a linear actuator. The feed actuator FA may be an electrical actuator. The feed actuator FA may be in the form of a solenoid, in accordance with an embodiment. The features of the feed actuator FA and the feeder/feed assembly F may include those of the incorporated '404 Patent Application or the incorporated '521 reference. For example, the feed assembly and feed actuator may be an automatic coil feeder assembly.

In one embodiment, the feeder may include a solenoid/feed actuator. The controller C activates the solenoid. The actual motion of feeding the nails/fastener may be caused by a spring. The spring moves forward and advances the nails/fasteners (e.g., after the solenoid is deenergized). That is, the controller C activates/energizes the solenoid, the spring is then pulled down and then the solenoid is deenergized. This pushes the nail/fastener forward. So, it is the combination of the spring and the solenoid that advance the nails/fasteners. When the solenoid is deenergized, the movement (e.g., forward and advancement) of the nails/fasteners start. The time at which the solenoid is energized may be referred to as the feed cycle start time (i.e., for both the sequential and the bump activation modes).

In one embodiment, in the fastener device 100, the drive actuator DA is positioned on a first axis and the feed actuator FA is positioned on a second axis. These first and second axes are positioned at a non-perpendicular angle relative to one another. In one embodiment, the first (or actuation) axis is positioned such that the axis is parallel to the drive axis. In another embodiment, the second (or actuation) axis is parallel to the feed direction (i.e., the axis extending at an angle from near a bottom of the fastener device 100 to the nose assembly 18). In yet another embodiment, the first axis is positioned such that the axis is parallel to the drive axis, and the second axis is parallel to the feed direction. In one embodiment, the drive axis of the drive actuator DA is provided in a first plane and an axis of the feed actuator FA defining the feed direction is provided in a second plane, and the first plane is different from the second plane. The axes and planes of the drive actuator DA and the feed actuator FA are also shown and described in the incorporated '404 Patent Application. While the exemplary illustrated embodiments are described as using solenoids (for the drive and feed actuators DA, FA) as the electro-mechanical actuators, other forms of actuators may be used, for example, an electric motor, a single dual-action solenoid, a multi-stage solenoid, a solenoid in conjunction with a mechanical biasing element, such as a spring, a linear motion machine, or any combination thereof.

The controller C and circuitry may be provided at the back end of the housing 122. The controller C may be provided in the form of a microprocessor and one or more circuit boards, for example, including relay module and one or more MOSFETs. The controller C may also be configured to communicate with the motor M. The controller C may be programmed to provide power and/or control signals (e.g., electric pulses) over control lines to the drive and feed actuators DA and FA. That is, the drive actuator DA and the feed actuator FA are connected to the controller C via control lines. The controller C may be configured to operate both the driver and feeder, to control the start timing of the feeder, etc.

The controller C may be configured to receive input from the trigger 180, which affects movement of the driver D and feed rod to load fasteners in the nose assembly 18 of the fastener device 10. Upon receiving a signal from the trigger switch TS and an operation restricting mechanism (e.g., contact trip assembly 21) and its switch CTS, the controller C may be connected to the battery 182 to receive power therefrom and the drive actuator DA may be activated. The controller C may signal the motor M to energize or activate for a predetermined amount of time (e.g., by applying voltage to the motor M) before activating the drive actuator DA. As is understood by a person of ordinary skill in the art, the controller C is configured for outputting a driving control signal to the drive system and for outputting a motor signal to control an operation of the motor M via selectively energizing coils (of the stator) of a plurality of phases of the motor M. In one embodiment, the controller C may include the control unit and/or features of said unit as disclosed in U.S. Pat. No. 10,693,344, which is commonly assigned and is incorporated herein by reference in its entirety.

The fastener device 100 further comprises one or more sensors S that are configured to sense the characteristic of the energy assembly.

The fastener device 100 may include a sensor configured to sense the speed of the flywheel. In one embodiment, the sensor S is configured to sense a condition in the power source that is indicative of a level of kinetic energy of an element in the power source and to generate a sensor signal in response thereto. For example, the sensor S may be operable for sensing a speed of the output shaft of the motor M or a speed of the flywheel. As a person of ordinary skill in the art would appreciate from this patent application, the sensor S may sense the characteristic directly or indirectly. For example, the speed of the output shaft of the motor M or the speed of the flywheel may be sensed directly, as through encoders, eddy current sensors or Hall effect sensors, or indirectly, as through the back electromotive force of the motor M. Back electromotive force, which is produced when the motor M is not powered by the battery but rather driven by the speed and inertia of the components of the motor assembly (especially the flywheel) may be employed.

In another embodiment, a position detector may be associated with the motor M to output a position signal corresponding to the position of a rotor (at one place) of the motor M. The position detector may be a magnetic sensor such as a hall sensor/element or a hall IC, for example, and a hall signal may be output as the position signal. The position signal output from the position detector is input to the controller C. The controller C may include an inverter circuit design to output a control signal to the motor M, to control the rotation of the motor M. In one embodiment, the inverter circuit has six switching elements for supplying driving current to the respective coils of the motor M, wherein three of the switching elements are high-side switching elements and three of the switching elements are low-side switching elements.

The fastener device 100 may have multiple modes of operation. For example, one mode of operation of the fastener device 100 may be a sequential fire mode (or sequential operational mode) in which the contact trip assembly is first be abutted against a workpiece (so that the contact trip sensor/switch CTS generates the contact trip sensor signal and thereafter the trigger switch TS is actuated to generate the trigger signal).

Another mode of operation of the fastener device 100 may be a mandatory bump feed mode (or bump operational mode) in which the trigger switch TS is first actuated to generate the trigger signal and thereafter the contact trip assembly is abutted against a workpiece so that the contact trip sensor/switch CTS generates the contact trip sensor signal.

Yet another mode of operation may be a combination mode that permits either sequential fire or bump feed wherein no particular sequence is required (i.e., the trigger sensor signal and the contact trip sensor signal may be made in either order or simultaneously).

The fastener device 100 may also include a mode selector switch. The mode selector switch may be a switch that produces a mode selector switch signal that is indicative of a desired mode of operation of the fastener device 10.

The controller C may be configured such that the fastener device 100 will be operated in a given mode, such as the bump feed mode, only in response to the receipt of a specific signal from the mode selector switch. For example, the placement of the mode selector switch in a first position causes a signal of a predetermined first voltage to be applied to the controller C, while the placement of the mode selector switch in a second position causes a signal of a predetermined second voltage to be applied to the controller C. Limits may be placed on the voltage of one or both of the first and second voltages, such as ± a value or a percentage of voltage, so that if the voltage of one or both of the signals is outside the limits the controller C may default to a given feed mode (e.g., to the sequential feed mode) or operational condition (e.g., inoperative).

The present patent application and its various embodiments as described above uniquely address the observed, noted and researched findings and improve on the prior and current state of the art systems. The listed products, features and embodiments as described in the present patent application should not be considered as limiting in any way.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as “generally,” “substantially,” “approximately,” and “about” may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A fastener device that drives a fastener from a plurality of fasteners into a workpiece comprising:
- a housing;
- a nose assembly connected with the housing, the nose assembly having a nosepiece and a drive channel into which the fastener to be driven into the workpiece is fed;
- a magazine configured to hold the plurality of fasteners and from which the fastener is fed into the drive channel;
- a driver movable along a drive axis of the nose assembly to engage and drive the fastener in the drive channel into the workpiece;
- a motor assembly disposed within the housing, the motor assembly configured to transmit power to the driver to thereby cause the driver to translate along the drive axis;
- a trigger switch carried by the housing, the trigger switch configured to be actuated in response to an operator input to generate a trigger switch signal;
- a time-of-flight sensor configured to measure a distance between the nosepiece and the workpiece based on a time difference between emission of a signal toward the workpiece and a return of the signal to the sensor after reflection from the workpiece and to generate a sensor signal in response thereto; and
- a controller having one or more processors and operatively connected to the motor assembly, the sensor and the trigger switch,
- wherein the controller is configured to initiate a drive cycle of the fastener device to drive the fastener into the workpiece based on the trigger switch signal and the sensor signal.

2. The fastener device of claim 1, wherein the sensor is a non-contact sensor.

3. The fastener device of claim 1, wherein the sensor is disposed on at least one of a portion of the magazine or a portion of the housing.

4. The fastener device of claim 1, wherein the sensor is a light sensor.

5. The fastener device of claim 1, wherein the sensor is a distance sensor.

6. The fastener device of claim 1, wherein the controller is configured to initiate the drive cycle of the fasten er device to drive the fastener into the workpiece when the sensor signal meets a predetermined threshold.

7. The fastener device of claim 6, wherein the predetermined threshold includes a range of the distance between the nosepiece and the workpiece that is between 0 and 2 millimeters (mm).

8. The fastener device of claim 1, wherein the sensor includes a transmitter configured to transmit a signal to the workpiece and a receiver configured to receive a reflected signal from the workpiece.

9. The fastener device of claim 1, wherein the nosepiece is disposed at a forward end of the nose assembly.

10. A fastener device that drives a fastener from a plurality of fasteners into a workpiece comprising:
- a housing;
- a nose assembly connected with the housing, the nose assembly having a nosepiece and a drive channel into which the fastener to be driven into the workpiece is fed;
- a magazine configured to hold the plurality of fasteners and from which the fastener is fed into the drive channel;
- a driver movable along a drive axis of the nose assembly to engage and drive the fastener in the drive channel into the workpiece;
- a motor assembly disposed within the housing, the motor assembly configured to transmit power to the driver to thereby cause the driver to translate along the drive axis;
- a trigger switch carried by the housing, the trigger switch configured to be actuated in response to an operator input to generate a trigger switch signal;
- a sensor configured to sense a distance between the nosepiece and the workpiece and generate a sensor signal in response thereto; and
- a controller having one or more processors and operatively connected to the motor assembly, the sensor and the trigger switch,
- wherein the controller is configured to initiate a drive cycle of the fastener device to drive the fastener into the workpiece based on the trigger switch signal and the sensor signal,
- wherein the sensor is disposed on at least one of a portion of the magazine or a portion of the housing,
- wherein the sensor includes a plurality of sensors,
- wherein one of the plurality of sensors is disposed on the portion of the magazine, and
- wherein the other of the plurality of sensors is disposed on the portion of the housing.

11. The fastener device of claim 10, wherein the sensor is a time-of-flight sensor.

12. The fastener device of claim 10, wherein the one of the plurality of sensors disposed in the portion of the magazine is in an area near/in the vicinity of the nosepiece.

13. The fastener device of claim 10, wherein the other of the plurality of sensors are disposed on either side of the nosepiece.

14. The fastener device of claim 10, wherein the other of the plurality of sensors are disposed on the nose assembly and/or the housing in an area after a rear end of the nosepiece.

15. The fastener device of claim 10, wherein the plurality of sensors includes a first time-of-flight sensor and a second time-of-flight sensor,
- wherein a longitudinal axis of the first time-of-flight sensor is positioned below a longitudinal axis of the nosepiece, and
- wherein a longitudinal axis of the second time-of-flight sensor is positioned above the longitudinal axis of the nosepiece.

16. The fastener device of claim 15, wherein the plurality of sensors also includes a third time-of-flight sensor,
- wherein a longitudinal axis of the third time-of-flight sensor is positioned above the longitudinal axis of the nosepiece,
- wherein the longitudinal axis of the second time-of-flight sensor and the longitudinal axis of the third time-of-flight sensor lie in the same plane that is positioned above a plane of the longitudinal axis of the nosepiece, and
- wherein the longitudinal axis of the first time-of-flight sensor lies in a plane that is positioned below the plane of the longitudinal axis of the nosepiece.

17. The fastener device of claim 10, wherein the sensor includes a time-of-flight sensor that uses the time that it takes for photons to travel between the nosepiece and the workpiece to determine the distance between the nosepiece and the workpiece.

18. The fastener device of claim 10, wherein the sensor is a light sensor.

19. The fastener device of claim 10, wherein the sensor is a distance sensor.

20. The fastener device of claim 10, wherein the controller is configured to initiate the drive cycle of the fastener device to drive the fastener into the workpiece when the sensor signal meets a predetermined threshold.

21. The fastener device of claim 20, wherein the predetermined threshold includes a range of the distance between the nosepiece and the workpiece that is between 0 and 2 millimeters (mm).

22. The fastener device of claim 10, wherein the sensor includes a transmitter configured to transmit a signal to the workpiece and a receiver configured to receive a reflected signal from the workpiece.

23. The fastener device of claim 10, wherein the nosepiece is disposed at a forward end of the nose assembly.

* * * * *